US012693000B2

(12) United States Patent
Kamakura et al.

(10) Patent No.: US 12,693,000 B2
(45) Date of Patent: Jul. 28, 2026

(54) WAVELENGTH CONVERSION DEVICE AND ILLUMINATION DEVICE

(71) Applicants: STANLEY ELECTRIC CO., LTD., Tokyo (JP); KYOTO UNIVERSITY, Kyoto (JP)

(72) Inventors: Ryosuke Kamakura, Tokyo (JP); Yasuyuki Kawakami, Tokyo (JP); Yosuke Maemura, Tokyo (JP); Keijiro Takashima, Tokyo (JP); Shunsuke Murai, Kyoto (JP)

(73) Assignees: KYOTO UNIVERSITY, Kyoto (JP); STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/877,098

(22) PCT Filed: Jun. 13, 2023

(86) PCT No.: PCT/JP2023/021863
§ 371 (c)(1),
(2) Date: Dec. 19, 2024

(87) PCT Pub. No.: WO2023/248865
PCT Pub. Date: Dec. 28, 2023

(65) Prior Publication Data

US 2025/0377088 A1 Dec. 11, 2025

(30) Foreign Application Priority Data

Jun. 20, 2022 (JP) ................................ 2022-098682

(51) Int. Cl.
*F21V 9/32* (2018.01)
*F21Y 115/30* (2016.01)

(52) U.S. Cl.
CPC ............ *F21V 9/32* (2018.02); *F21Y 2115/30* (2016.08)

(58) Field of Classification Search
CPC ..... F21V 1/17; F21V 3/08; F21V 3/12; F21V 5/10; F21V 9/30; F21K 9/64
See application file for complete search history.

(56) References Cited

U.S. PATENT DOCUMENTS 9,157,605 B2 10/2015 Rodriguez et al.
9,416,927 B2 8/2016 Rodriguez et al.
(Continued)

FOREIGN PATENT DOCUMENTS

JP 2014508379 A 4/2014
JP 2016535304 A 11/2016
(Continued)

OTHER PUBLICATIONS

International Search Report (ISR) (and English language translation thereof) dated Aug. 15, 2023 issued in International Application No. PCT/JP2023/021863.
(Continued)

*Primary Examiner* — Sean P Gramling
(74) *Attorney, Agent, or Firm* — Holtz, Holtz & Volek PC

(57) ABSTRACT

A wavelength conversion device includes a flat plate-shaped phosphor portion, a first nanoantenna group, a translucent body portion, and a second nanoantenna group. The flat plate-shaped phosphor portion includes a phosphor to be excited by an excitation light to emit a fluorescence. The first nanoantenna group is provided at a lower surface side of the phosphor portion and includes a plurality of first metal nanoantennas arranged at a first pitch. The translucent body portion is filled between adjacent first nanoantennas, formed on the lower surface of the phosphor portion to cover the lower surface of the phosphor portion, and made of a
(Continued)

translucent material. The second nanoantenna group is provided on an upper surface of the phosphor portion and includes a plurality of second metal nanoantennas arranged at a second pitch on the upper surface of the phosphor portion.

16 Claims, 11 Drawing Sheets

(56) References Cited

U.S. PATENT DOCUMENTS

| | | | | |
|---|---|---|---|---|
| 9,982,850 | B2 | 5/2018 | Rodriguez et al. | |
| 10,732,328 | B2 | 8/2020 | Murai et al. | |
| 10,907,773 | B2 | 2/2021 | Murai et al. | |
| 11,060,699 | B2 | 7/2021 | Murai et al. | |
| 2016/0190403 | A1* | 6/2016 | Verschuuren ...... | H10H 20/8513 257/98 |
| 2016/0363274 | A1 | 12/2016 | Rodriguez et al. | |
| 2017/0350563 | A1 | 12/2017 | Lunz et al. | |
| 2021/0132483 | A1 | 5/2021 | Okumura | |
| 2024/0384858 | A1 | 11/2024 | Yokobayashi et al. | |

FOREIGN PATENT DOCUMENTS

| | | | |
|---|---|---|---|
| JP | 2018013688 | A | 1/2018 |
| JP | 2019519895 | A | 7/2019 |
| JP | 2021071671 | A | 5/2021 |

OTHER PUBLICATIONS

Written Opinion dated Aug. 15, 2023 issued in International Application No. PCT/JP2023/021863.

U.S. Appl. No. 18/856,281, First Named Inventor: Susumu Noda; Title: “Light-Emitting Device”; filed Oct. 11, 2024.

U.S. Appl. No. 18/873,607, First Named Inventor: Yosuke Maemura; Title: “Wavelength Conversion Device and Illumination Device”; filed Dec. 10, 2024.

Japanese Office Action (and an English language translation thereof) dated Feb. 3, 2026, issued in counterpart Japanese Application No. 2022-098682.

Japanese Office Action (and an English language translation thereof) dated May 12, 2026, issued in counterpart Japanese Application No. 2022-098682

* cited by examiner

WAVELENGTH CONVERSION DEVICE AND ILLUMINATION DEVICE

TECHNICAL FIELD

The present invention relates to a wavelength conversion device and an illumination device.

BACKGROUND ART

There has been disclosed an illumination device that narrows an angle of a fluorescence using a metal antenna made of nanosized metal particles (hereinafter referred to as a nanoantenna). For example, Patent Document 1 discloses an illumination device that includes a first wavelength conversion layer, an antenna array that is formed on an upper surface of the first wavelength conversion layer and includes a plurality of nanoantennas, and a second wavelength conversion layer formed on the upper surface of the first wavelength conversion layer while filling the nanoantenna array.

Patent Document 1: JP-T-2016-535304

DISCLOSURE OF THE INVENTION

Problems to be Solved by the Invention

In the illumination device as disclosed in Patent Document 1, a traveling direction of a fluorescence that is generated in the first wavelength conversion layer and reaches the nanoantenna is determined depending on a light diffraction condition determined by an arrangement of the nanoantenna and the like. For the fluorescence that reaches the nanoantenna and then returns to an inside of the first wavelength conversion layer according to the diffraction condition, there is a problem that the fluorescence propagates inside the wavelength conversion layer, then reaches a lower surface or a side end surface, and is emitted from there or absorbed by the nanoantenna, and thus, the fluorescence cannot be extracted from the illumination device.

The present invention is made in consideration of the above-described problem, and it is an object of the present invention to provide a wavelength conversion device and an illumination device capable of increasing a fluorescence extracted from a wavelength conversion layer to improve a light extraction efficiency.

Solutions to the Problems

A wavelength conversion device according to the present invention includes a flat plate-shaped phosphor portion, a first nanoantenna group, a translucent body portion, and a second nanoantenna group. The flat plate-shaped phosphor portion includes a phosphor to be excited by an excitation light to emit a fluorescence. The first nanoantenna group is provided at a lower surface side of the phosphor portion and including a plurality of first nanoantennas. The respective plurality of first nanoantennas are made of metals arranged at a first pitch. The translucent body portion is filled between the adjacent first nanoantennas, formed on the lower surface of the phosphor portion to cover the lower surface of the phosphor portion, and made of a translucent material. The second nanoantenna group is provided on an upper surface of the phosphor portion and including a plurality of second nanoantennas. The respective plurality of second nanoantennas are made of metals arranged at a second pitch on the upper surface of the phosphor portion.

DESCRIPTION OF PREFERRED EMBODIMENTS

Figure 1:
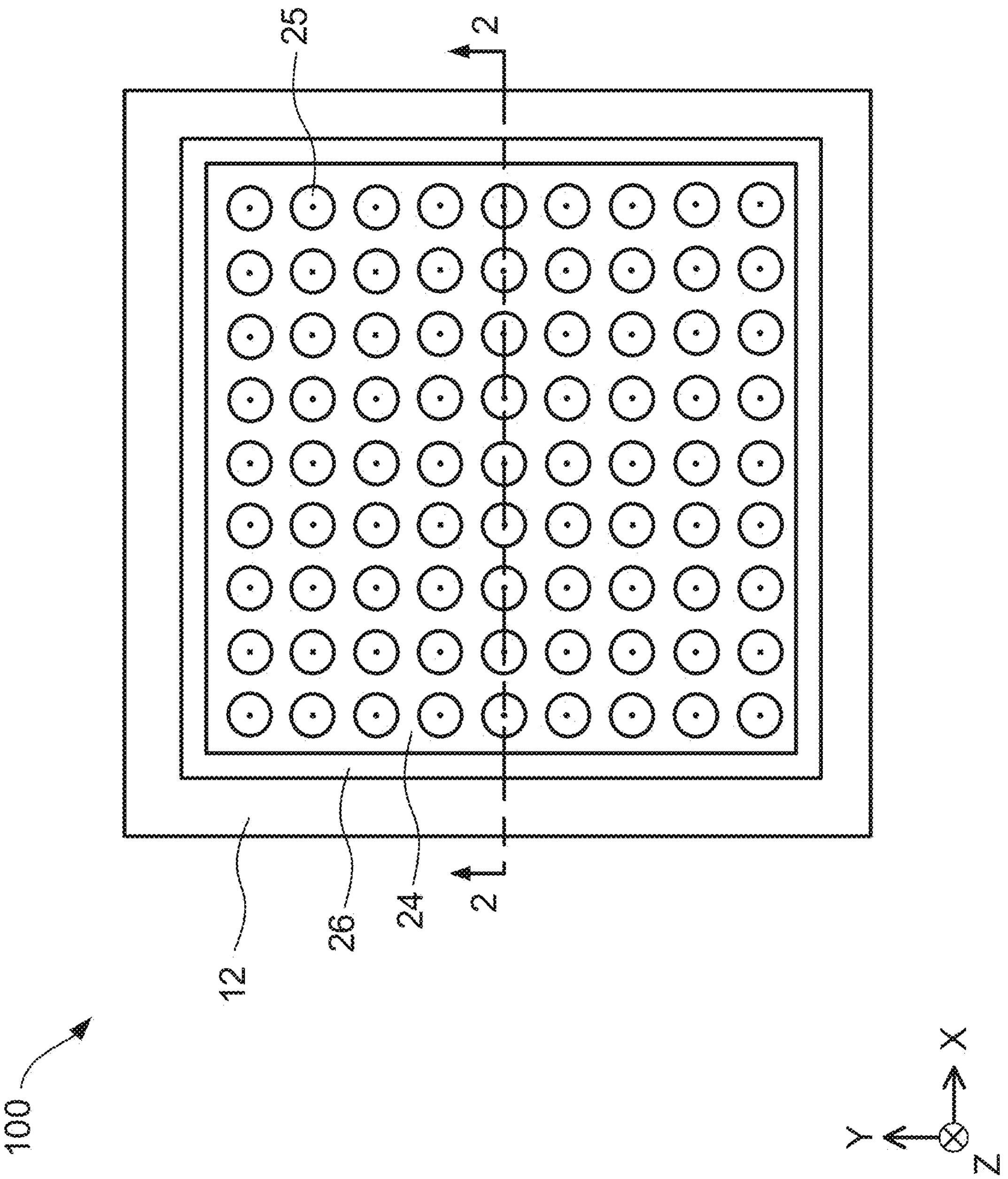
FIG. 1 is a top view of a wavelength conversion device according to a first embodiment.

The following specifically describes embodiments of the present invention with reference to the drawings. In the drawings, the same reference numerals are attached to the same components, and the explanation of the overlapping components will be omitted.

First Embodiment

Figure 2:
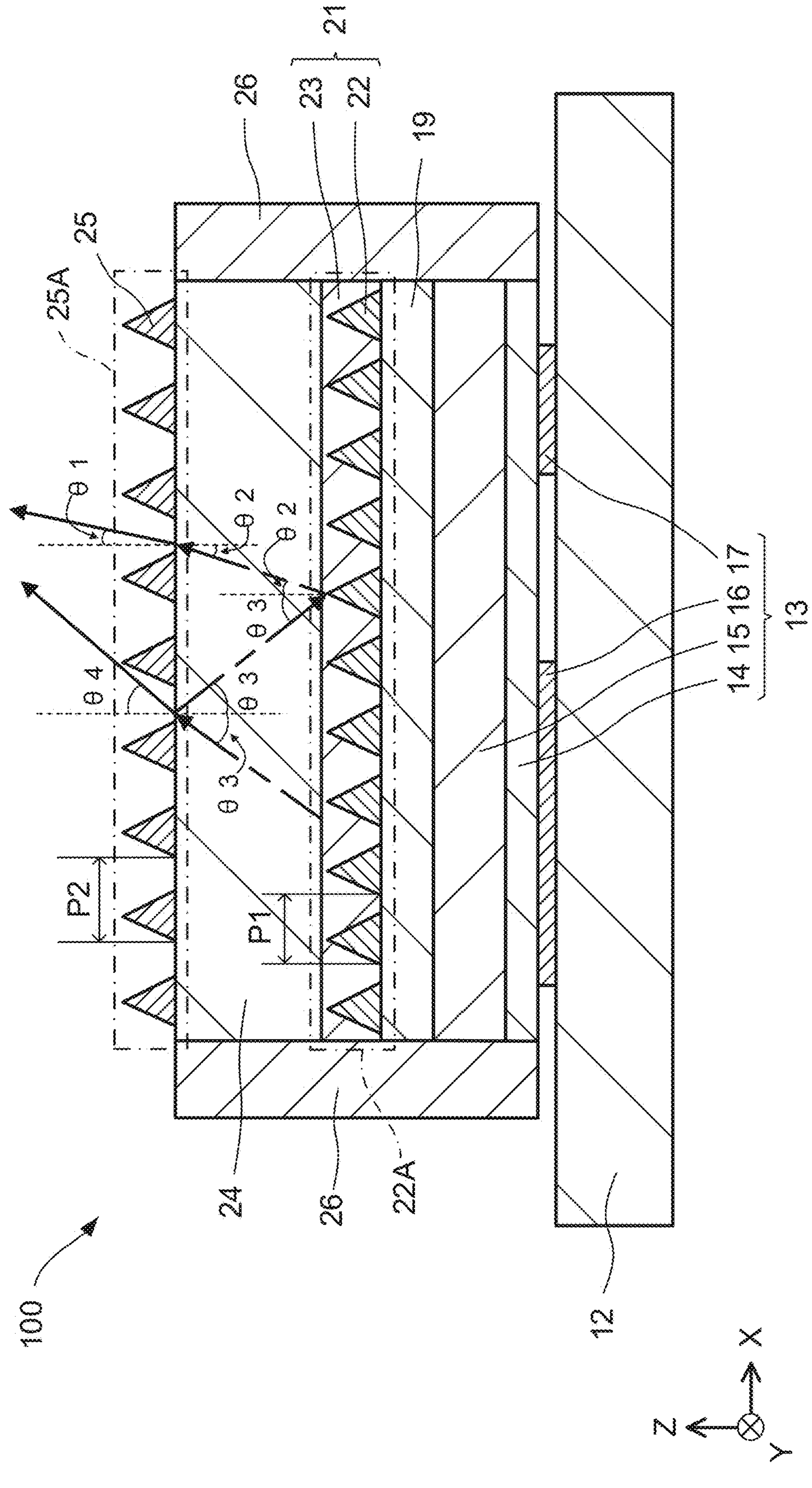
FIG. 2 is a cross-sectional view of the wavelength conversion device according to the first embodiment.

With reference to FIG. 1 and FIG. 2, a configuration of a wavelength conversion device 100 according to the first embodiment is described. FIG. 1 is a top view of the wavelength conversion device 100 according to the first embodiment. FIG. 2 is a cross-sectional view of the wavelength conversion device 100 along the line 2-2 illustrated in FIG. 1.

The wavelength conversion device 100 according to the first embodiment includes a phosphor portion to be excited by an excitation light to emit a fluorescence, a first nanoantenna group including a plurality of first nanoantennas provided at a lower surface side of the phosphor portion, a translucent body portion that is filled between the adjacent first nanoantennas, formed on the lower surface of the phosphor portion to cover the lower surface of the phosphor portion, and made of a translucent material, and a second nanoantenna group including a plurality of second nanoantennas provided at an upper surface of the phosphor portion.

[Mounting Substrate]

A mounting substrate 12 is an insulating flat plate-shaped substrate having a rectangular upper surface shape. The mounting substrate 12 is made of, for example, aluminum nitride (AlN), alumina ($Al_2O_3$), or the like. Hereinafter, for ease of explanation, X, Y, and Z-axes are defined by having a direction perpendicular to the upper surface of the mounting substrate 12 as a Z-axis and directions along mutually perpendicular respective two sides of the mounting substrate 12 as an X-axis and a Y-axis.

[Light-Emitting Element]

A light-emitting element 13 is a light emission diode (LED) that is mounted on the upper surface of the mounting substrate 12 and has a rectangular upper surface shape. The light-emitting element 13 includes a semiconductor structure layer 14 with a light-emitting layer, a support substrate 15 disposed on an upper surface of the semiconductor structure layer 14, and a p-electrode 16 and an n-electrode 17 disposed on a lower surface of the semiconductor structure layer 14 and joined to the mounting substrate 12. That is, the light-emitting element 13 is flip-chip mounted to the mounting substrate 12.

The semiconductor structure layer 14 is a semiconductor stacked body including an n-type semiconductor layer, a light-emitting layer, and a p-type semiconductor layer (neither is illustrated) each containing gallium nitride (GaN) as a main material. When the light-emitting element 13 is driven, the light-emitting layer of the semiconductor structure layer 14 emits a blue light having a peak wavelength of 450 nm.

The support substrate 15 is a flat plate-shaped substrate having a rectangular upper surface shape. The support substrate 15 is made of a material, such as single crystal sapphire ($Al_2O_3$), having translucency to the blue light emitted from the semiconductor structure layer 14. The upper surface of the support substrate 15 is a light-emitting surface from which the light-emitting element 13 emits the blue light emitted from the light-emitting layer of the semiconductor structure layer 14.

The p-electrode 16 is an electrode electrically connected to the p-type semiconductor layer of the semiconductor structure layer 14. The p-electrode 16 is joined to a p-side wiring (not illustrated) formed on the upper surface of the mounting substrate 12 via a conductive joining member (not illustrated).

The n-electrode 17 is an electrode electrically connected to the n-type semiconductor layer via a through electrode (not illustrated) that penetrates the light-emitting layer and the p-type semiconductor layer of the semiconductor structure layer 14 in an up-down direction and has a side surface covered with an insulator. In other words, the n-electrode 17 is electrically connected to only the n-type semiconductor layer and insulated from the light-emitting layer and the p-type semiconductor layer. The n-electrode 17 is joined to an n-side wiring (not illustrated) formed on the upper surface of the mounting substrate 12 via a conductive joining member (not illustrated).

As described above, the light-emitting element 13 has a structure that emits a blue light generated by applying a voltage to the p-electrode 16 and the n-electrode 17 via the mounting substrate 12 to cause a current flowing through the semiconductor structure layer 14 from the upper surface of the support substrate 15.

[First Translucent Portion]

A first translucent portion 19 is a flat plate-shaped portion formed on the upper surface of the light-emitting element 13, that is, the upper surface of the support substrate 15. In this embodiment, the first translucent portion 19 is described as one made of sapphire.

The first translucent portion 19 has the same planar shape as the support substrate 15, and an outer edge of the first translucent portion 19 overlaps with an outer edge of the support substrate 15 in top view from above the wavelength conversion device 100, that is, viewed in a direction along the Z-direction. The first translucent portion 19 has a lower surface bonded to the upper surface of the support substrate 15 via a translucent joining material (not illustrated). The first translucent portion 19 is formed to have a thickness of 500 μm or less, and especially, preferred to be formed to have the thickness of 100 μm or less.

A material of the first translucent portion 19 only needs to be a material having a translucency to the blue light emitted from the light-emitting element 13, and may be quartz or AlN.

[Second Translucent Portion]

A second translucent portion 21 is a portion that is formed on an upper surface of the first translucent portion 19 and includes first nanoantennas 22 and a translucent body portion 23. The second translucent portion 21 is formed to have a thickness of 1000 nm or less, and especially, preferred to be formed to have the thickness of 500 nm or less.

The first nanoantennas 22 are circular cone-shaped metal bodies each formed on the upper surface of the first translucent portion 19. A plurality of the first nanoantennas 22 are arranged in a square grid pattern along each of the X-direction and the Y-direction at a first pitch P1 on the upper surface of the first translucent portion 19, thus forming a first nanoantenna group 22A. The first pitch P1 is a pitch smaller than a peak wavelength of a fluorescence emitted from a phosphor portion 24 described later, and is preferably 500 nm or less.

Each of the first nanoantennas 22 is configured by a material having a plasma frequency in a visible light region, such as Au (aurum), Ag (argentum), Cu (copper), Pt (platinum), Pd (palladium), Al (aluminum) and Ni (nickel), and an alloy or a stacked body containing them. Especially, each of the first nanoantennas 22 is preferably configured by a metal with low absorption in the visible light region, such as aluminum (Al) and argentum (Ag).

The translucent body portion 23 is a translucent film body formed to cover the upper surface of the first translucent portion 19 and to be filled between the adjacent first nanoantennas 22. In this embodiment, the translucent body portion 23 is described as one formed of a $SiO_2$ film. A material of the translucent body portion 23 only needs to be a material having a translucency to the blue light emitted from the light-emitting element 13.

In FIG. 2, while the translucent body portion 23 is illustrated to completely cover the first nanoantenna 22, that is, illustrated such that the upper surface of the translucent body portion 23 is spaced from upper ends of the first nanoantennas 22, the upper ends of the first nanoantennas 22 may be in contact with the upper surface of the translucent body portion 23.

In this embodiment, the above-described first translucent portion 19 may be provided as necessary, and the second translucent portion 21 may be formed on the upper surface of the support substrate 15 of the light-emitting element 13 without providing the first translucent portion 19. That is, a configuration in which the first nanoantennas 22 and the translucent body portion 23 are provided on the upper surface of the support substrate 15 to form the second translucent portion 21 may be employed.

[Phosphor Portion]

The phosphor portion 24 is a flat plate-shaped phosphor plate that is joined to the upper surface of the second translucent portion 21, has a thickness of 50 to 250 μm, and has a rectangular upper surface shape. The phosphor portion 24 has the same planar shape as the light-emitting element 13 and the second translucent portion 21, and an outer edge of the phosphor portion 24 overlaps with an outer edge of the second translucent portion 21 in top view viewed in the direction along the Z-direction.

The phosphor portion 24 is made of a phosphor that is excited by the blue light emitted from the light-emitting element 13 to emit a yellow fluorescence. Specifically, the phosphor portion 24 is, for example, a single crystal ceramic phosphor plate made of yttrium aluminum garnet phosphor activated with cerium (Ce) (YAG: Ce).

While the phosphor portion 24 is not limited to a phosphor plate configured by the single crystal YAG: Ce phosphor alone, the phosphor portion 24 preferably has a configuration in which a scattering is less likely to occur inside, is preferably a single-phase phosphor plate made of a single material, and may be a polycrystal in this case. The yellow fluorescence emitted from the phosphor has a peak wavelength of 520 to 570 nm, and has a yellow emission spectrum with a broad peak of from 480 nm to 700 nm.

When the blue light as an excitation light emitted from the light-emitting surface of the light-emitting element 13 is incident on the phosphor portion 24, a part of it directly passes through the phosphor portion 24, and another part of it excites the phosphor to cause the excited phosphor to emit a yellow fluorescence.

Therefore, the excitation light (blue light) that has passed through the phosphor portion 24 without a contribution to the generation of the fluorescence and the fluorescence (yellow light) emitted from the phosphor are emitted from the upper surface of the phosphor portion 24. Accordingly, a white light in which the blue light and the yellow fluorescence emitted from the upper surface of the phosphor portion 24 are mixed is extracted from the wavelength conversion device 100.

[Second Nanoantenna]

Second nanoantennas 25 are circular cone-shaped metal bodies each formed on the upper surface of the phosphor portion 24. A plurality of the second nanoantennas 25 are arranged in a square grid pattern along each of the X-direction and the Y-direction at a second pitch P2 on the upper surface of the phosphor portion 24, thus forming a second nanoantenna group 25A.

The second pitch P2 is a pitch smaller than the peak wavelength of the fluorescence emitted from the phosphor portion 24, and is preferably 500 nm or less. In this embodiment, the above-described first pitch P1 is equal to or less than the second pitch P2.

Each of the second nanoantennas 25 is configured by a material having a plasma frequency in a visible light region, such as Au, Ag, Cu, Pt, Pd, Al, and Ni, and an alloy or a stacked body containing them. Especially, each of the second nanoantennas 25 is preferably configured by a metal with low absorption in the visible light region, such as Al and Ag.

The arrangement aspects of the first nanoantenna 22 and the second nanoantenna 25 of FIG. 1 and FIG. 2 are merely schematically illustrated for describing the first nanoantenna 22 and the second nanoantenna 25. Actually, the light-emitting element 13 is, for example, 1 mm square, and in this case, the numbers of the first nanoantennas 22 and the second nanoantennas 25 are larger than those illustrated in FIG. 1 and FIG. 2.

[Light Reflecting Member]

A light reflecting member 26 is a member with a light reflectivity continuously extending to cover respective outer surfaces of the semiconductor structure layer 14 and the support substrate 15 of the light-emitting element 13, the first translucent portion 19, the second translucent portion 21, and the phosphor portion 24. The light reflecting member 26 is configured by a translucent resin containing light scattering particles, and for example, made of a resin material in which titanium oxide ($TiO_2$) particles are contained in a silicone resin.

Because of the light reflectivity, the light reflecting member 26 suppresses the excitation light emitted from the light-emitting element 13 and the fluorescence generated in the phosphor portion 24 to be emitted from the outer surface of the wavelength conversion device 100.

The following describes an improvement of a light extraction efficiency of the wavelength conversion device 100 of this embodiment with reference to FIG. 2. In FIG. 2, solid lines indicate the fluorescence emitted from the upper surface of the phosphor portion 24, and dash-dotted lines indicate the fluorescence traveling inside the phosphor portion 24.

Hereinafter, among the lights emitted from the light-emitting surface of the wavelength conversion device 100, in other words the upper surface of the phosphor portion 24, a fluorescence emitted with an angle of 30 degrees or less with respect to a straight line perpendicular to the upper surface is referred to as a narrow-angle fluorescence or a narrow-angle light. A light extraction efficiency of the narrow-angle light is described as the light extraction efficiency of the wavelength conversion device 100.

A traveling direction of a fluorescence that is generated in the phosphor portion 24 and reaches the second nanoantenna 25 is determined depending on a light diffraction condition determined by refractive indices of the phosphor portion 24 and air and the second pitch P2 of the second nanoantenna 25.

When the fluorescence is extracted according to the light diffraction condition, a diffraction angle θ1, which is an angle between a perpendicular line perpendicular to the upper surface of the phosphor portion 24 and a direction of the fluorescence emitted from the upper surface of the phosphor portion 24 on which the second nanoantennas 25 are formed, is determined by an incidence angle θ2 of the fluorescence that reached the upper surface of the phosphor portion 24 from the inside of the phosphor portion 24.

In the wavelength conversion device 100 of this embodiment, by forming the first nanoantenna group 22A below the phosphor portion 24, the narrow-angle fluorescence emitted from the upper surface of the phosphor portion 24 can be increased.

Figure 3:
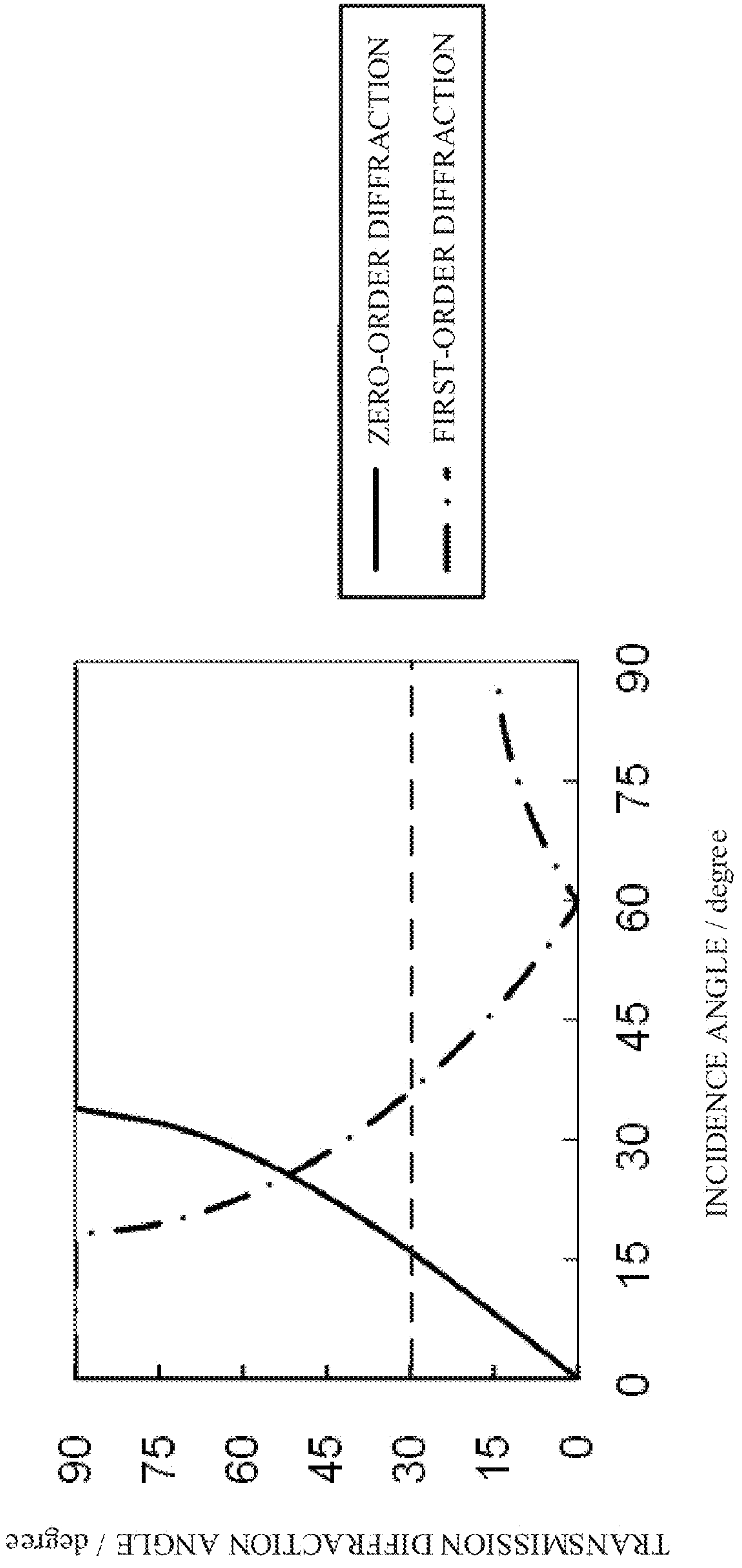
FIG. 3 is a graph illustrating a transmission diffraction angle relative to an incidence angle of a fluorescence in the wavelength conversion device according to the first embodiment.

Here, a specific relation between the diffraction angle θ1 and the incidence angle θ2 of the fluorescence is described by referring to FIG. 3. In the following description, a diffraction angle of 30 degrees or less as an emission angle of a narrow-angle light used as a calculation criterion of the light extraction efficiency is defined as a narrow angle range.

FIG. 3 is a graph illustrating a result of an analysis of the diffraction angle of the fluorescence emitted upward from the second nanoantenna 25 relative to the incidence angle of the fluorescence incident on the upper surface of the phosphor portion 24 using Rigorous Coupled Wave Analysis (RCWA) method.

In FIG. 3, the analysis is performed using a model in which the second nanoantennas 25 made of Al having a height of 150 nm, a diameter of 200 nm, and the second pitch P2 of 350 nm are arranged in a square grid pattern on the upper surface of the phosphor portion 24. The fluorescence incident on the upper surface of the phosphor portion 24 from the inside of the phosphor portion 24 is a linear polarization having a wavelength of 550 nm.

In FIG. 3, the diffraction angle relative to the incidence angle of the fluorescence when the fluorescence emitted from the upper surface of the phosphor portion 24 on which the second nanoantennas 25 are formed exhibits a zero-order diffraction is indicated by a solid line, and the diffraction angle relative to the incidence angle of the fluorescence when the fluorescence exhibits a first-order diffraction is indicated by a dash-dotted line.

In FIG. 3, the above-described narrow angle range is indicated by a dashed line. From FIG. 3, a condition (hereinafter also referred to as a narrow angle condition) of the incidence angle of the fluorescence when the fluorescence is emitted with a narrow angle from the upper surface of the phosphor portion 24 on which the second nanoantennas 25 are formed is from 0 to 17 degrees or from 37 to 89 degrees.

As illustrated in FIG. 2, when an incidence angle θ3 of the fluorescence does not satisfy the narrow angle condition, that is, when the incidence angle of the fluorescence is from 17 to 37 degrees, the fluorescence is totally reflected by the upper surface of the phosphor portion 24 and returned to the inside of the phosphor portion 24, or emitted with a diffraction angle θ4 greater than 30 degrees. For example, the fluorescence returned to the inside of the phosphor portion 24 travels toward a lower surface of the phosphor portion 24 with the emission angle same as the incidence angle (with the angle θ3), and is incident on the first nanoantenna 22 inside the second translucent portion 21.

In the wavelength conversion device 100 of this embodiment, the first nanoantennas 22 are arranged at an arrangement pitch (first pitch P1) that causes each of the first nanoantennas 22 to change the angle of the fluorescence traveling from the phosphor portion 24 and return the fluorescence to the inside of the phosphor portion 24, and generates a lot of fluorescence with the angle satisfying the narrow angle condition at this time. When the fluorescence returned to the inside of the phosphor portion 24 reaches the first nanoantenna 22 with the angle θ3 remaining not to satisfy the narrow angle condition, the fluorescence may be diffracted as a fluorescence with the angle θ2 satisfying the narrow angle condition by the first nanoantenna 22.

A fluorescence component not satisfying the narrow angle condition in the fluorescence excited by the excitation light inside the phosphor portion 24 and directly traveling to the second translucent portion 21 may be similarly diffracted as the fluorescence with the angle θ2 satisfying the narrow angle condition by the first nanoantenna 22.

Therefore, the fluorescence that is diffracted by the first nanoantenna 22 and reaches the upper surface of the phosphor portion 24 is extracted as a narrow-angle fluorescence (fluorescence with the diffraction angle θ1) by the second nanoantenna 25 with a higher proportion because a lot of fluorescence satisfying the above-described narrow angle condition has been generated.

Accordingly, since the wavelength conversion device 100 of this embodiment allows increasing the proportion of the fluorescence extracted with the narrowed angle by the second nanoantenna 25, the light extraction efficiency of the wavelength conversion device 100 can be improved.

Figure 4:
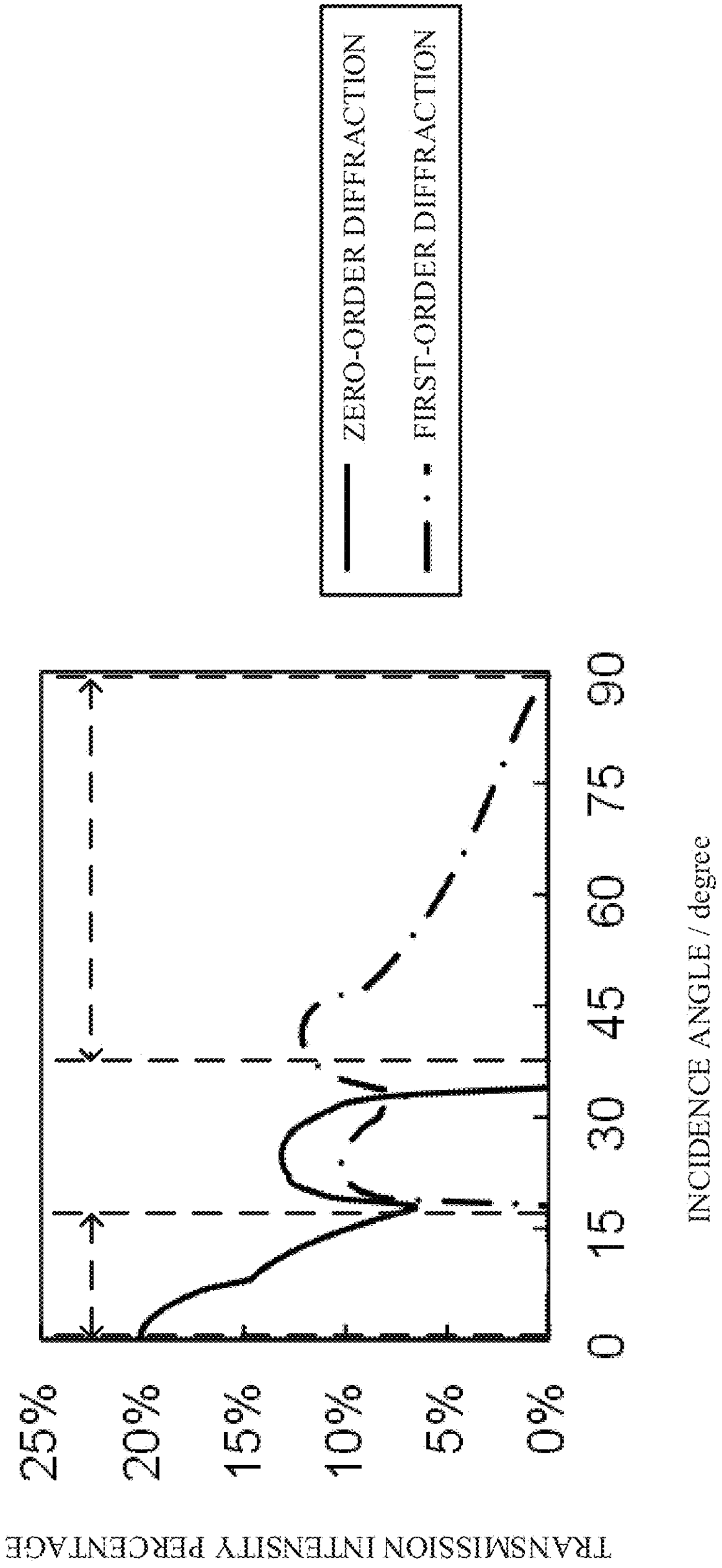
FIG. 4 is a graph illustrating a percentage of a transmission intensity relative to the incidence angle of the fluorescence in the wavelength conversion device according to the first embodiment.

FIG. 4 is a graph illustrating a result of an analysis of a percentage of an intensity of the fluorescence emitted from the upper surface of the phosphor portion 24 on which the second nanoantennas 25 are formed relative to the incidence angle of the fluorescence using the model similar to the model used in FIG. 3 by the RCWA method. In FIG. 4, dashed arrows indicate ranges of the incidence angle of the fluorescence when the fluorescence is extracted from the second nanoantenna 25 with a narrowed angle (with the diffraction angle of 30 degrees or less).

From FIG. 4, the intensity percentage of the fluorescence at the zero-order diffraction when the incidence angle of the fluorescence is from 0 to 17 degrees exhibits about 7 to 20%, and the intensity percentage of the fluorescence at the first-order diffraction when the incidence angle of the fluorescence is from 37 to 89 degrees exhibits about 1 to 12%. The intensity percentage of the fluorescence when the incidence angle of the fluorescence does not satisfy the narrow angle condition (when the diffraction angle is from 17 to 37 degrees) exhibits about 13% at maximum.

In the wavelength conversion device 100 of this embodiment, each of the first nanoantennas 22 and the second nanoantennas 25 has a circular cone shape narrowing upward as illustrated in FIG. 1 and FIG. 2.

According to this embodiment, the second nanoantenna 25 having the circular cone shape increases the proportion of the fluorescence emitted from the upper surface of the phosphor portion 24 on which the second nanoantennas 25 are formed when the fluorescence is incident from a bottom surface side having a large cross-sectional area of the second nanoantenna 25.

According to this embodiment, the first nanoantenna 22 having the circular cone shape increases the proportion of the fluorescence reflected by the first nanoantenna 22 when the fluorescence is incident from a vertex side having a small cross-sectional area of the first nanoantenna 22.

Therefore, according to this embodiment, since the proportion of the fluorescence reflected toward the second nanoantenna 25 can be increased at the first nanoantenna 22, and the proportion of the fluorescence emitted from the upper surface of the phosphor portion 24 can be increased at the second nanoantenna 25, the light extraction efficiency of the wavelength conversion device 100 can be improved.

[Method for Forming First Nanoantenna and Second Nanoantenna]

The following describes a method for forming the first nanoantenna 22 and the second nanoantenna 25 in the wavelength conversion device 100 of this embodiment.

First, the first nanoantennas 22 as the first nanoantenna group are formed on the upper surface of the flat plate-shaped first translucent portion 19 (Step 1). When the support substrate 15 of the light-emitting element 13 doubles as the first translucent portion 19, the light-emitting element 13 is mounted to the upper surface of the mounting substrate 12, and then the first nanoantennas 22 are formed on the upper surface of the support substrate 15.

Specifically, first, a metal film of Al or Ag as a base material of the first nanoantenna 22 is formed on the upper surface of the first translucent portion 19 by an electron beam evaporation or a sputtering film formation. Then, a resist is applied over the formed metal film, and a patterning is performed in a square grid pattern using a nano-imprint apparatus or an ion beam drawing apparatus. Then, a dry etching is performed using the resist as an etching mask, and then the resist is removed, thereby forming the first nanoantenna 22.

Next, the translucent body portion 23 is formed on the upper surface of the first translucent portion 19 to cover the upper surface of the first translucent portion 19 while the translucent body portion 23 is filled between the respective first nanoantennas 22 (Step 2). Specifically, a $SiO_2$ film is formed by an electron beam evaporation or a sputtering film formation, thereby forming the translucent body portion 23.

Next, a surface polishing is performed on the upper surface of the translucent body portion 23 by a mechanical polishing process and a CMP (Chemical Mechanical Polishing) process to smooth the upper surface (Step 3). Thus, the flat plate-shaped second translucent portion 21 including the first nanoantenna 22 and the translucent body portion 23 is formed.

Next, the phosphor portion 24 is joined to the upper surface of the second translucent portion 21 (Step 4). For example, a surface polishing is performed on the lower surface of the phosphor portion 24 by a mechanical polishing process and a CMP process thereafter, thus smoothing the lower surface. Then, the upper surface of the second translucent portion 21 is joined to the lower surface of the phosphor portion 24 by plasma activated bonding, thereby allowing directly joining the second translucent portion 21 to the phosphor portion 24. The joining method is not limited to the direct joining, and for example, the joining may be performed by placing the phosphor portion 24 on the upper surface of the second translucent portion 21 via a transparent resin and then hardening it.

Finally, the second nanoantennas 25 as the second nanoantenna group are formed on the upper surface of the phosphor portion 24 (Step 5). Specifically, similarly to the method for forming the first nanoantenna 22, a metal film is formed on the upper surface of the phosphor portion 24, a patterning is performed thereafter, and then an etching is performed, thus forming the second nanoantenna 25.

By the above-described process of Steps 1 to 5, the first nanoantenna 22 and the second nanoantenna 25 of the wavelength conversion device 100 can be formed.

[Validations]

Figure 5:
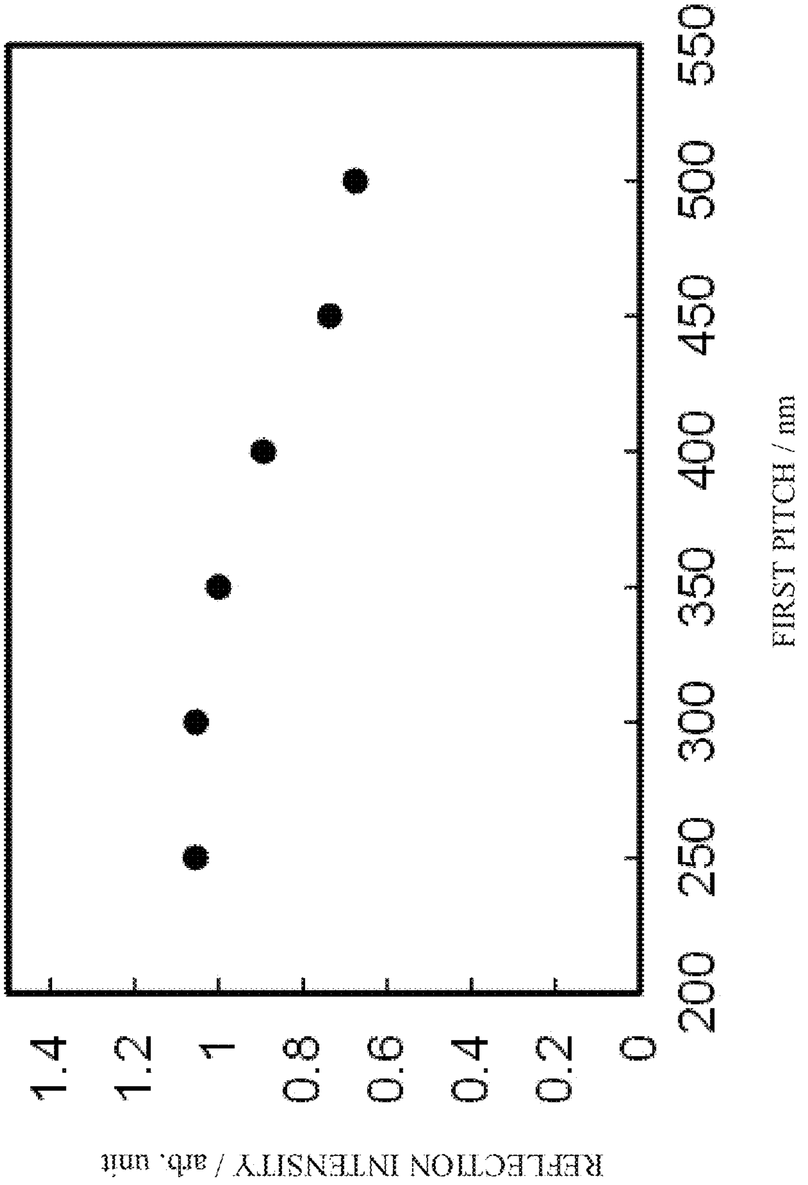
FIG. 5 is a graph illustrating a reflection intensity of the fluorescence relative to an arrangement pitch of a nanoantenna in the wavelength conversion device according to the first embodiment.
Figure 6:
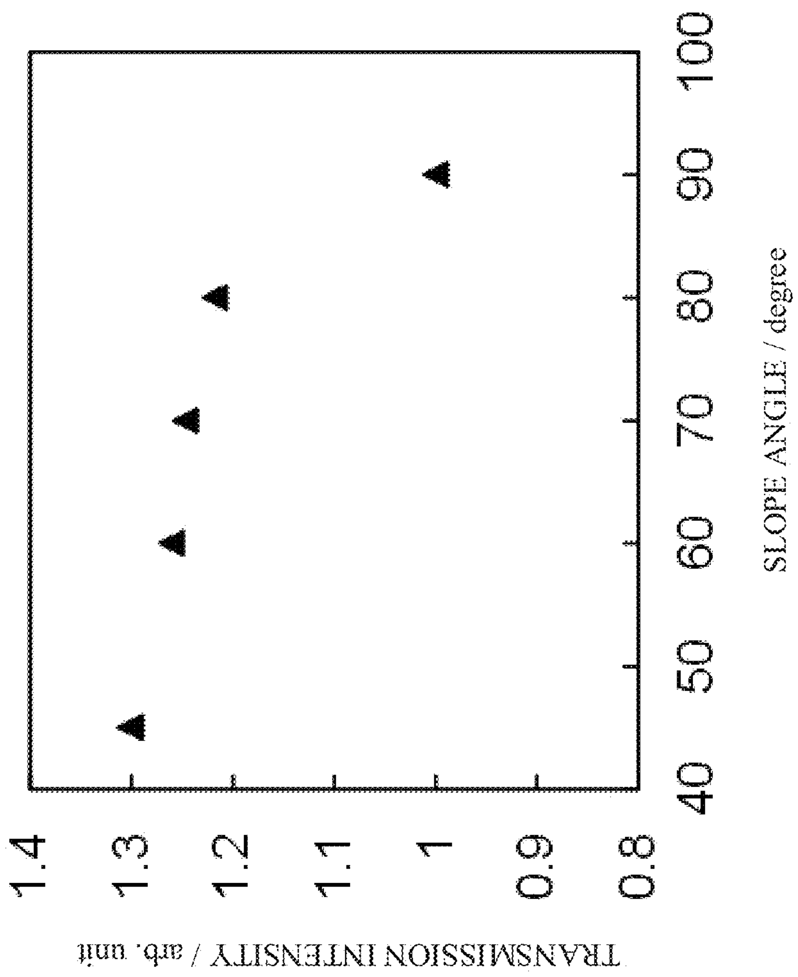
FIG. 6 is a graph illustrating a transmission intensity of the fluorescence relative to a slope angle of the nanoantenna in the wavelength conversion device according to the first embodiment.
Figure 7:
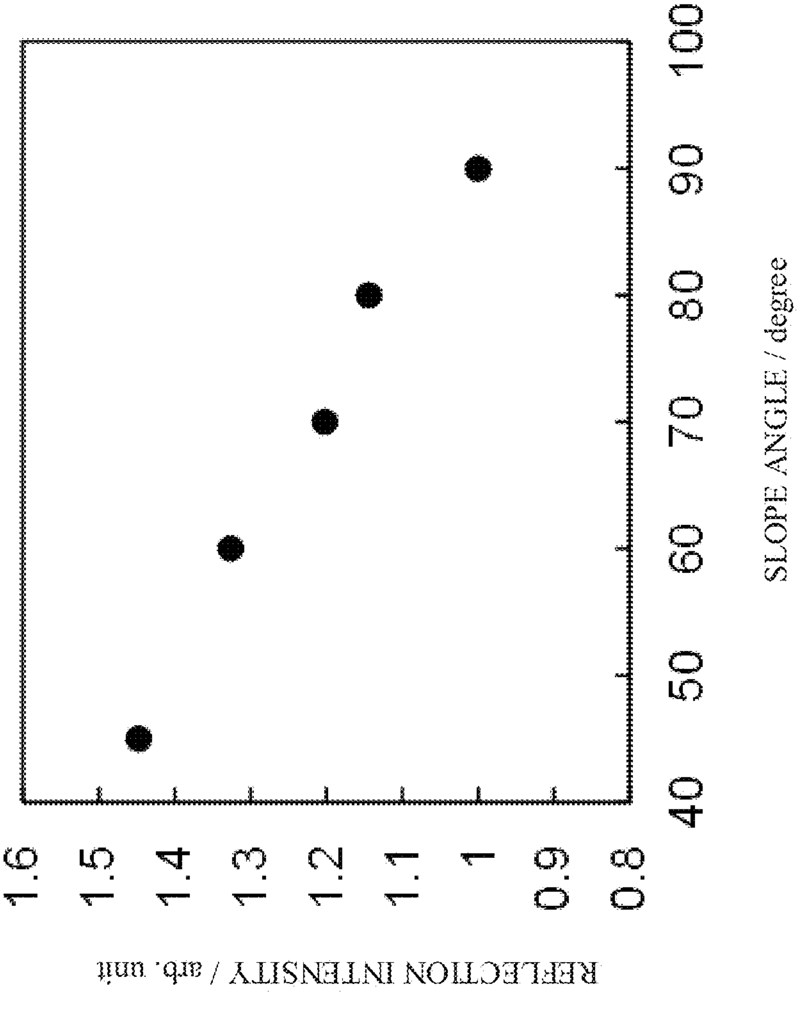
FIG. 7 is a graph illustrating the reflection intensity of the fluorescence relative to a slope angle of the nanoantenna in the wavelength conversion device according to the first embodiment.

The following describes validations performed on the wavelength conversion device 100 of the present invention and validation results thereof with reference to FIG. 5 to FIG. 7.

First, the validation result of a reflection intensity of the fluorescence when the first pitch P1 of the first nanoantenna 22 is changed is described with reference to FIG. 5.

FIG. 5 is a graph illustrating a result of an analysis of the reflection intensity of the fluorescence relative to the first pitch P1 when the angle of the fluorescence reflected by the first nanoantenna 22 satisfies the above-described narrow angle condition using the RCWA method.

In FIG. 5, the analysis is performed using a model in which the first nanoantennas 22 made of Al having the height of 150 nm and the diameter of 200 nm are arranged in a square grid pattern on the upper surface of the first translucent portion 19.

In FIG. 5, the analysis is performed using a model in which the second nanoantennas 25 made of Al having the height of 150 nm, the diameter of 200 nm, and the second pitch P2 of 350 nm are arranged in a square grid pattern on the upper surface of the phosphor portion 24.

In FIG. 5, the first translucent portion 19 is made of sapphire, and the translucent body portion 23 is made of $SiO_2$. The light incident on the first nanoantenna 22 is a linear polarization having a wavelength of 550 nm. In FIG. 5, the reflection intensity of the fluorescence reflected by the first nanoantenna 22 when the first pitch P1 is 350 nm is assumed to 1.

From FIG. 5, when the first pitch P1 is smaller than the second pitch P2, the reflection intensity of the fluorescence by the first nanoantenna 22 increases. On the other hand, when the first pitch P1 is larger than the second pitch P2, the reflection intensity of the fluorescence by the first nanoantenna 22 decreases.

From this result, by setting the first pitch P1 to be equal to or less than the second pitch P2 (350 nm), the reflection intensity of the fluorescence satisfying the narrow angle condition can be increased by the first nanoantenna 22.

Next, with reference to FIG. 6 and FIG. 7, the validation result of the transmission intensity of the fluorescence when respective slopes of the first nanoantenna 22 and the second nanoantenna 25 are changed is described.

FIG. 6 is a graph illustrating a result of an analysis of the transmission intensity of the fluorescence emitted from the upper surface of the phosphor portion 24 relative to a slope angle when the second nanoantenna 25 is provided with a slope so as to narrow upward from the column-shaped state using the RCWA method.

In FIG. 6, the validation is performed using a model similar to the model used in FIG. 5, and the only difference is that the slope of the second nanoantenna 25 is changed from 90 degrees (column-shaped state). In FIG. 6, the transmission intensity when the slope of the second nanoantenna 25 is 90 degrees is assumed to 1.

From FIG. 6, as the slope angle of the second nanoantenna 25 is decreased, that is, as the second nanoantenna 25 approaches the circular cone shape from the columnar shape, the transmission intensity of the fluorescence emitted from the upper surface of the phosphor portion 24 increases.

FIG. 7 is a graph illustrating a result of an analysis of the reflection intensity of the fluorescence reflected toward the inside of the phosphor portion 24 relative to a slope angle when the first nanoantenna 22 is provided with a slope so as to narrow upward from the column-shaped state using the RCWA method. In FIG. 7, the reflection intensity when the first nanoantenna 22 is 90 degrees is indicated as 1. The analytical model is similar to that in the validation of FIG. 6.

From FIG. 7, as the slope angle of the first nanoantenna 22 is decreased, that is, as the first nanoantenna 22 approaches the circular cone shape from the columnar shape, the reflection intensity of the fluorescence reflected toward the inside of the phosphor portion 24 increases.

From the results illustrated in FIG. 6 and FIG. 7, according to the wavelength conversion device 100 of this embodiment, by providing the slopes to the first nanoantenna 22 and the second nanoantenna 25 to be narrowed upward, the reflection intensity of the fluorescence in the case of the first nanoantenna 22 and the transmission intensity of the fluorescence in the case of the second nanoantenna 25 can be each increased.

Second Embodiment

Figure 8:
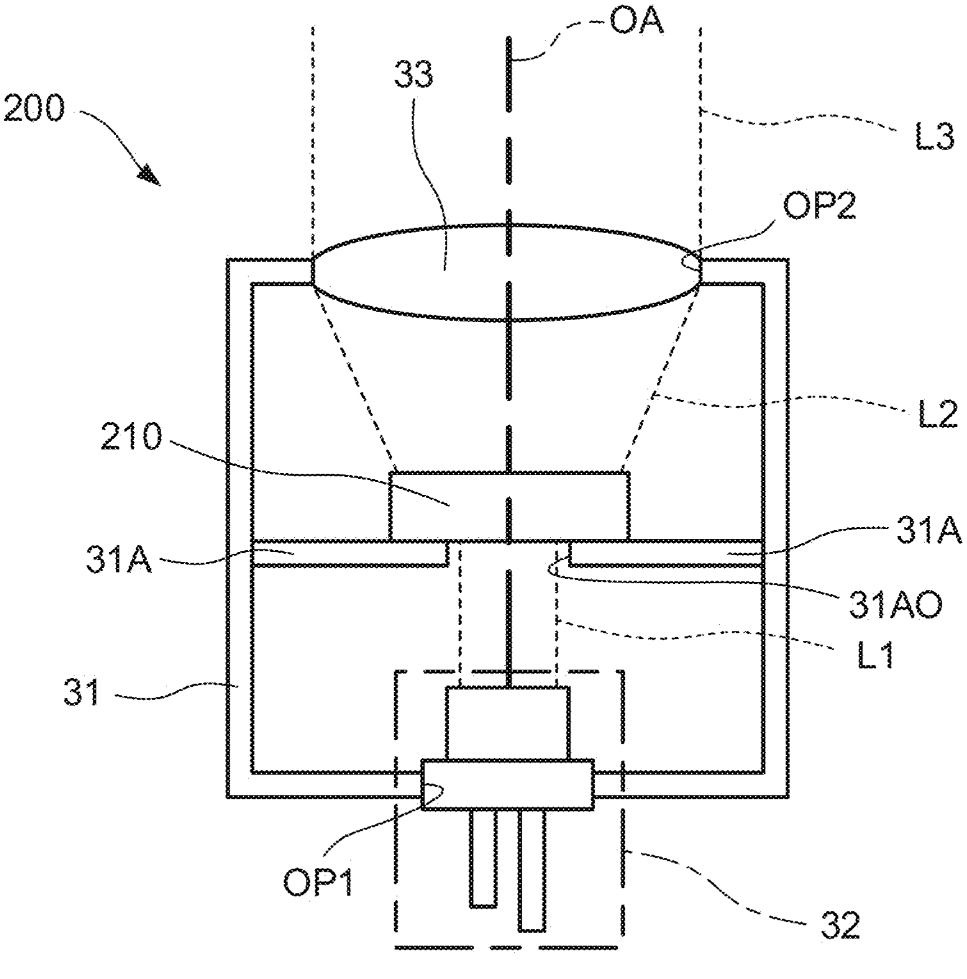
FIG. 8 is a cross-sectional view of an illumination device according to a second embodiment.
Figure 9:
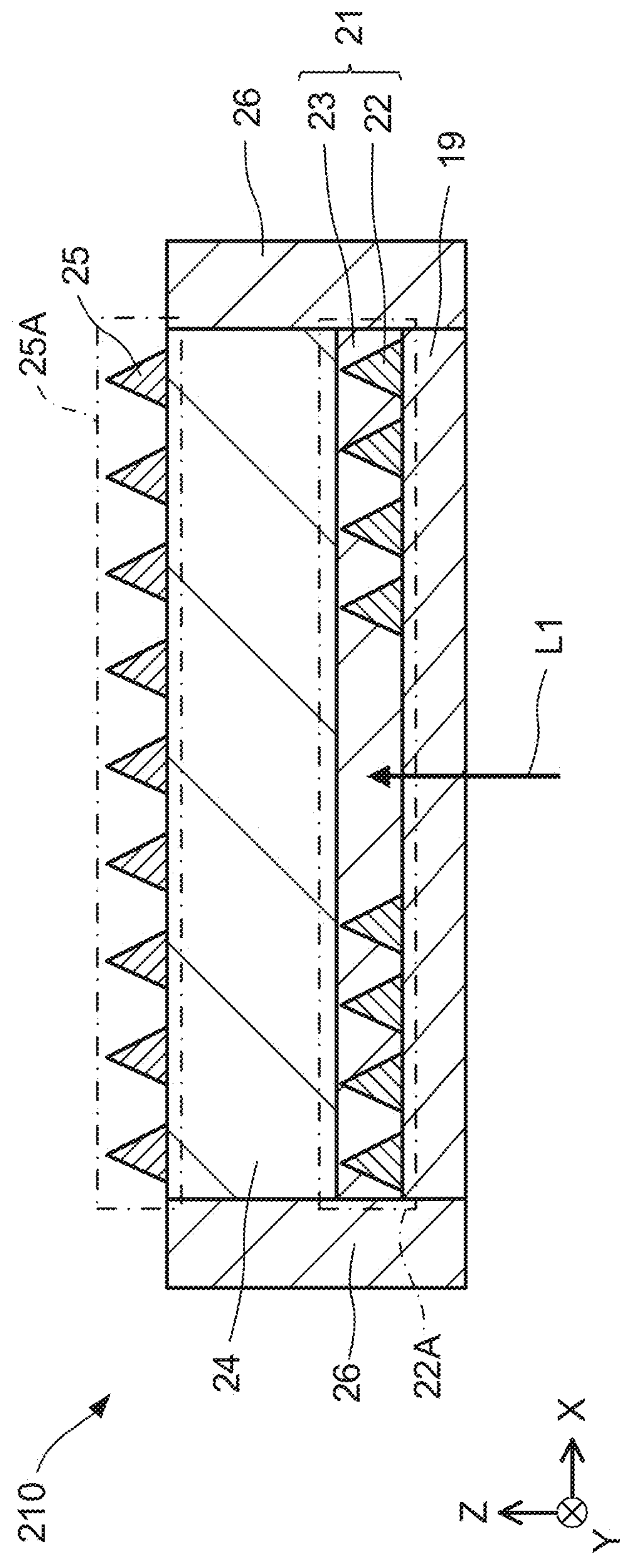
FIG. 9 is a cross-sectional view of a wavelength conversion device according to the second embodiment.

Next, the second embodiment is described with reference to FIG. 8 and FIG. 9. FIG. 8 is a cross-sectional view schematically illustrating a configuration of an illumination device 200 according to the second embodiment. FIG. 9 is a cross-sectional view of a wavelength conversion device 210. In FIG. 8, hatching is omitted in consideration of the visibility.

A casing 31 is a box-shaped casing provided with opening portions OP1 and OP2 at respective two surfaces facing to one another. The casing 31 is provided with a support structure 31A for supporting an object at a position between the opening portion OP1 and the opening portion OP2. The support structure 31A is provided with a through hole 31AO penetrating the support structure 31A at the center thereof.

A light source 32 is a light source that is secured in the opening portion OP1 and emits a light L1 having a predetermined wavelength toward the opening portion OP2. The opening portion OP1, the through hole 31AO, and the opening portion OP2 are formed on an optical axis OA.

In this embodiment, the light source 32 is a laser light source with a light-emitting layer made of an InGaN-based semiconductor. The light source 32 emits a blue light having a peak wavelength of about 450 nm as the light L1.

The wavelength conversion device 210 is supported by the support structure 31A to be located on the optical axis OA. Specifically, the wavelength conversion device 210 is disposed on the upper surface of the support structure 31A in a manner in which a center portion of a bottom surface through which the optical axis OA passes is exposed from the through hole 31AO of the support structure 31A. In other words, in the wavelength conversion device 210, an area excluding the center of the bottom surface of the wavelength conversion device 210 is supported by the support structure 31A.

The wavelength conversion device 210 includes, as illustrated in FIG. 9, the first translucent portion 19, the second translucent portion 21, the phosphor portion 24, the second nanoantenna 25, and the light reflecting member 26, which are illustrated in FIG. 2. In other words, the wavelength conversion device 210 has a configuration in which the mounting substrate 12 and the light-emitting element 13 are removed from the configuration of the wavelength conversion device 100 in the first embodiment.

The wavelength conversion device 210 emits the excitation light (blue light) that has passed through the phosphor portion 24 without a contribution to the generation of the fluorescence and the fluorescence (yellow light) emitted from the phosphor of the phosphor portion 24. FIG. 8 illustrates the excitation light and the fluorescence emitted from the wavelength conversion device 210 together as a light L2.

In the wavelength conversion device 210, the first nanoantennas 22 are formed only in an area of a part of the upper surface of the first translucent portion 19. Specifically, as illustrated in FIG. 9, the first nanoantennas 22 are formed in an area excluding an area of the incidence of the light L1 emitted from the light source 32 in the upper surface of the first translucent portion 19. In other words, the first nanoantennas 22 are not formed in the area of the direct incidence of the light L1 in the upper surface of the first translucent portion 19.

Such a formation aspect of the first nanoantenna 22 allows suppressing the reflection of the light L1 as the excitation light emitted from the light source 32 by the first nanoantenna 22 before the incidence on the phosphor portion 24. This allows increasing the proportion of the excitation light incident on the phosphor portion 24, and allows generating the larger number of the fluorescence inside the phosphor portion 24.

The wavelength conversion device 210 may include a lens that collects a laser light between the light source 32 and the wavelength conversion device 210 in the incidence plane side of the light L1. Collecting the laser light by the lens allows efficiently irradiating the wavelength conversion device 210 with the laser light, and reducing the area of the direct incidence of the light L1 in the upper surface of the first translucent portion 19, therefore, the area in which the first nanoantennas 22 are formed can be enlarged, and the proportion of the fluorescence reflected by the first nanoantenna 22 can be increased.

A lens 33 is an optical member secured in the opening portion OP2. That is, the lens 33 is located on the optical axis OA. The lens 33 is an optical lens that receives the light L2 emitted from the wavelength conversion device 210 and forms the light L2 in a desired light distribution to generate a light L3 as an illumination light. For the lens 33, for example, a spherical lens and an aspherical lens can be used. The light L3 generated by the lens 33 is extracted outside the casing 31.

The illumination device 200 having the configuration as described above can provide the effect similar to that of the first embodiment as well. That is, since the proportion of the fluorescence extracted with the narrowed angle by the second nanoantenna 25 can be increased, the light extraction efficiency of the illumination device 200 can be improved.

Third Embodiment

Figure 10:
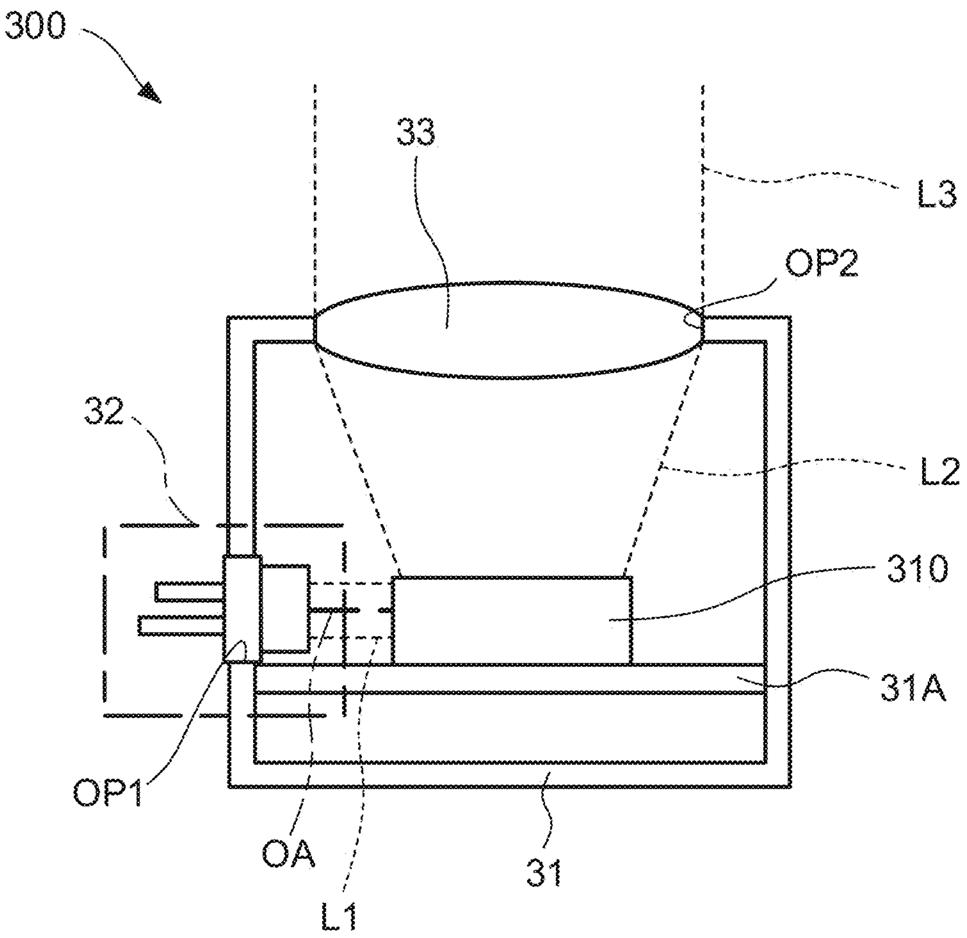
FIG. 10 is a cross-sectional view of an illumination device according to a third embodiment.
Figure 11:
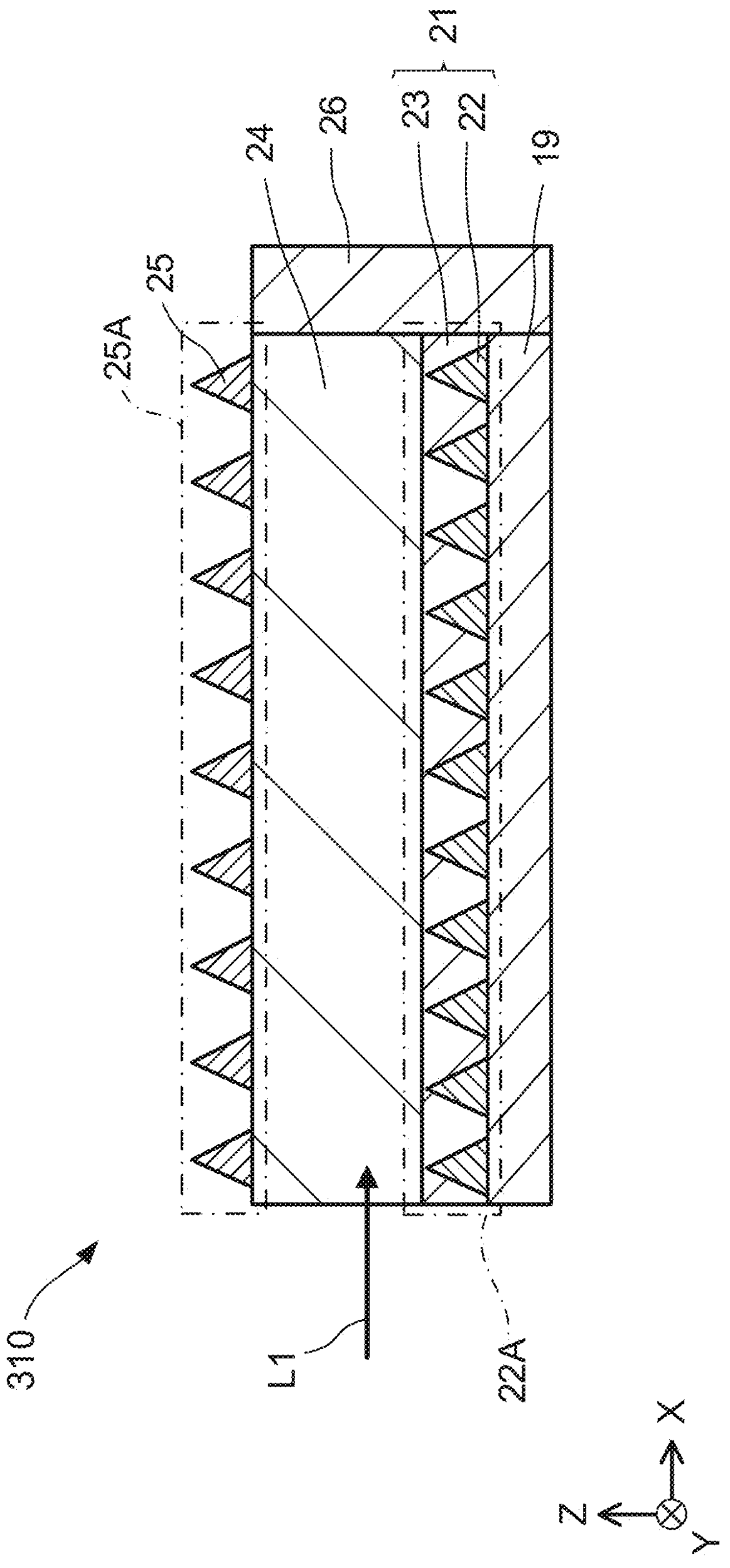
FIG. 11 is a cross-sectional view of a wavelength conversion device according to the third embodiment.

Next, the third embodiment is described with reference to FIG. 10 and FIG. 11. FIG. 10 is a cross-sectional view schematically illustrating a configuration of an illumination device 300 according to the third embodiment. FIG. 11 is a cross-sectional view of a wavelength conversion device 310. In FIG. 10, hatching is omitted in consideration of the visibility. The following describes only a difference from the first and the second embodiments.

A casing 31 is a box-shaped casing provided with an opening portion OP1 at one surface of mutually facing two surfaces. The casing 31 is provided with an opening portion OP2 at one surface of two surfaces mutually facing in a direction perpendicular to the direction in which the above-described two surfaces mutually face. The casing 31 is provided with a support structure 31A that faces the opening portion OP2 and supports an object.

Similarly to the second embodiment, a light source 32 is secured in the opening portion OP1, and a lens 33 is secured in the opening portion OP2. In this embodiment, the wavelength conversion device 310 is disposed on an upper surface of the support structure 31A such that an optical axis OA of a light L1 emitted from the light source 32 is perpendicular to one side surface of the wavelength conversion device 310. That is, in this embodiment, the light L1 emitted from the light source 32 is incident on the side surface of the wavelength conversion device 310.

The wavelength conversion device 310 includes, as illustrated in FIG. 11, the first translucent portion 19, the second translucent portion 21, the phosphor portion 24, the second nanoantenna 25, and the light reflecting member 26, which are illustrated in FIG. 2. In other words, the wavelength conversion device 310 has a configuration in which the mounting substrate 12 and the light-emitting element 13 are removed from the configuration of the wavelength conversion device 100 in the first embodiment.

In the wavelength conversion device 310, the light reflecting member 26 is continuously formed from a lower end of a side surface of the first translucent portion 19 to an upper end of a side surface of the phosphor portion 24 excluding a part of an outer surface on which the light L1 emitted from the light source 32 is incident. In other words, a part of the outer surface of the wavelength conversion device 310 on which the light L1 emitted from the light source 32 is incident is exposed from the light reflecting member 26.

According to the illumination device 300 of this embodiment, the light L1 as the excitation light emitted from the light source 32 is directly incident from the side surface exposed from the light reflecting member 26 of the phosphor portion 24. Therefore, for example, when the light L1 emitted from the light source 32 is incident from the lower side of the wavelength conversion device 310, the reflection of the light L1 by the first nanoantenna 22 can be suppressed.

Further, according to the illumination device 300 of this embodiment, since the light reflecting member 26 is formed on the side surfaces excluding the one side surface on which the light L1 is incident of the wavelength conversion device 310, emission of the light L1 from the other side surfaces can be suppressed.

The illumination device 300 having the configuration as described above can provide the effect similar to that of the first embodiment as well. That is, since the proportion of the fluorescence extracted with the narrowed angle by the second nanoantenna 25 can be increased, the light extraction efficiency of the illumination device 300 can be improved.

While the case where the phosphor portion 24 is a phosphor plate made of a single crystal YAG: Ce phosphor is described in the embodiments described above, the configuration of the phosphor portion 24 is not limited to this, and the phosphor portion 24 only needs to have a configuration in which light scattering is less likely to occur inside. For example, a plate having a medium of resin or glass containing phosphor particles that emit a yellow fluorescence may be used.

While the case where the first nanoantennas 22 and the second nanoantennas 25 are arranged in a square grid pattern is described in the embodiments described above, the arrangement aspect is not limited to this. For example, the first nanoantennas 22 and the second nanoantennas 25 may be arranged in a triangular grid pattern.

While the case where the first nanoantenna 22 has the circular cone shape is described in the embodiments described above, it is not limited to this, and the first nanoantenna 22 only needs to have a shape that allows reflecting the fluorescence toward the second nanoantenna 25. For example, the first nanoantenna 22 may have another cone shape, such as a quadrangular pyramid (or cone), or a truncated cone shape, such as a circular truncated cone shape.

While the case where the second nanoantenna 25 has the circular cone shape is described in the embodiments described above, it is not limited to this, and the second nanoantenna 25 only needs to have a shape that allows emitting the fluorescence in the narrow angle. For example, the second nanoantenna 25 may have another cone shape, such as a quadrangular pyramid (or cone), or a truncated cone shape, such as a circular truncated cone shape.

While the case where the wavelength conversion device includes the light reflecting member 26 is described in the embodiments described above, an optical multilayer reflective film or a metal reflective film may be used instead of the light reflecting member 26 depending on the required light distribution, or a combination thereof may be provided.

DESCRIPTION OF REFERENCE SIGNS

100, 210, 310 Wavelength conversion device
200, 300 Illumination device
12 Mounting substrate
13 Light-emitting element
14 Semiconductor structure layer
15 Support substrate
16 p-electrode
17 n-electrode
19 First translucent portion
21 Second translucent portion
22 First nanoantenna
23 Translucent body portion
24 Phosphor portion
25 Second nanoantenna
26 Light reflecting member
31 Casing
32 Light source (laser light source)
33 Lens

The invention claimed is:

1. An illumination device comprising:
a light source that emits excitation light;
a plurality of first nanoantennas provided above the light source, the respective plurality of first nanoantennas being provided at a first pitch and being made of metals;
a translucent body portion that is filled between the adjacent first nanoantennas, the translucent body portion being made of a translucent material without a phosphor;
a flat plate-shaped phosphor portion provided on the translucent body portion, the phosphor portion including a phosphor excitable by the excitation light to emit a fluorescence, and the translucent body portion being formed on a lower surface of the phosphor portion to cover the lower surface of the phosphor portion; and
a plurality of second nanoantennas provided on an upper surface of the phosphor portion, the respective plurality of second nanoantennas being provided on the upper surface of the phosphor portion at a second pitch and being made of metals.

2. The illumination device according to claim 1, wherein the translucent body portion has translucency to fluorescence having a wavelength in range of at least 480 nm to 700 nm.

3. The illumination device according to claim 1, wherein the translucent body portion has translucency to the excitation light.

4. The illumination device according to claim 1, wherein the translucent body portion is made of SiO2 film.

5. A wavelength conversion device comprising:
a first translucent portion;
a second translucent portion provided on the first translucent portion and including a plurality of first nanoantennas and a translucent body portion, the respective plurality of first nanoantennas being provided on the first translucent portion at a first pitch and being made of metals, and the translucent body portion being formed on the first translucent portion, filled between the adjacent first nanoantennas, and made of a translucent material;
a flat plate-shaped phosphor portion provided on the second translucent portion and including a phosphor to be excited by an excitation light to emit a fluorescence; and
a plurality of second nanoantennas provided on an upper surface of the phosphor portion, the respective plurality of second nanoantennas being provided on the upper surface of the phosphor portion at a second pitch and being made of metals,
wherein the translucent body portion covers a lower surface of the phosphor portion.

6. The wavelength conversion device according to claim 5, wherein the first pitch is equal to or less than the second pitch.

7. The wavelength conversion device according to claim 5, wherein the first nanoantennas have a cone shape or a truncated cone shape narrowing upward.

8. The wavelength conversion device according to claim 5, wherein the second nanoantennas have a cone shape or a truncated cone shape narrowing upward.

9. The wavelength conversion device according to claim 5, wherein the first nanoantennas are formed only in one area of the upper surface of the translucent portion.

10. The wavelength conversion device according to claim 5, further comprising:

a light reflecting member formed at a part of a side surface of the wavelength conversion device and continuously formed from a lower end of a side surface of the translucent body portion to an upper end of a side surface of the phosphor portion.

11. The wavelength conversion device according to claim 5, wherein:

the phosphor portion has a property of being excited by the excitation light to emit the fluorescence having a peak wavelength of 520 nm to 570 nm, and the first nanoantennas have the first pitch of 500 nm or less.

12. The wavelength conversion device according to claim 11, wherein the phosphor portion is made of yttrium aluminum garnet activated with cerium.

13. The wavelength conversion device according to claim 5, wherein the phosphor portion includes a single crystal phosphor.

14. The wavelength conversion device according to claim 5, wherein the first nanoantennas and the second nanoantennas are arranged in a square grid pattern or a triangular grid pattern.

15. The wavelength conversion device according to claim 5, wherein the first nanoantennas and the second nanoantennas are made of Al or Ag.

16. An illumination device comprising:

the wavelength conversion device according to claim 1; and a light source that emits the excitation light toward the phosphor portion.

* * * * *